(12) United States Patent
Kawabata (10) Patent No.: US 9,851,498 B2
(45) Date of Patent: Dec. 26, 2017

(54) LIGHT SOURCE DEVICE AND DISPLAY APPARATUS

(71) Applicant: Sakai Display Products Corporation, Sakai-shi, Osaka (JP)

(72) Inventor: Ryota Kawabata, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 117 days.

(21) Appl. No.: 14/897,518

(22) PCT Filed: Jun. 28, 2013

(86) PCT No.: PCT/JP2013/067934
§ 371 (c)(1),
(2) Date: Dec. 10, 2015

(87) PCT Pub. No.: WO2014/207936
PCT Pub. Date: Dec. 31, 2014

(65) Prior Publication Data
US 2016/0139330 A1    May 19, 2016

(51) Int. Cl.
| | |
|---|---|
| F21V 7/04 | (2006.01) |
| F21V 8/00 | (2006.01) |
| F21V 15/01 | (2006.01) |
| F21V 29/507 | (2015.01) |
| G02F 1/1335 | (2006.01) |
| F21Y 115/10 | (2016.01) |

(52) U.S. Cl.
CPC .......... *G02B 6/0091* (2013.01); *F21V 15/012* (2013.01); *F21V 29/507* (2015.01); *G02B 6/0085* (2013.01); *G02B 6/0093* (2013.01); *F21Y 2115/10* (2016.08); *G02B 6/0068* (2013.01); *G02F 1/133615* (2013.01); *G02F 2001/133628* (2013.01)

(58) Field of Classification Search
CPC .. G02B 6/0068; G02B 6/0085; G02B 6/0086; G02B 6/0091; G02B 6/0093; G02F 1/133615; G02F 1/133308; G02F 2001/133628; G02F 2001/133322; F21V 15/012; F21V 29/507; F21Y 2115/10
See application file for complete search history.

(56) References Cited

U.S. PATENT DOCUMENTS

| | | | | |
|---|---|---|---|---|
| 7,771,108 | B2 * | 8/2010 | Iwasaki ............... | G02B 6/0041 349/65 |
| 8,982,298 | B2 * | 3/2015 | Chen ................ | G02F 1/133308 349/58 |
| 9,164,227 | B2 * | 10/2015 | He ....................... | G02B 6/0091 |

(Continued)

FOREIGN PATENT DOCUMENTS

| | | |
|---|---|---|
| JP | 2009-093939 A | 4/2009 |
| JP | 2010-232100 A | 10/2010 |

(Continued)

*Primary Examiner* — Alexander Garlen
(74) *Attorney, Agent, or Firm* — Rudy J. Ng; Bret E. Field; Bozicevic, Field & Francis LLP (57) ABSTRACT

Provided is a light source device which includes a light guide plate for emitting light entered through one side surface from a front surface thereof, a light source disposed opposing the one side surface of the light guide plate, a rear housing body for housing the light guide plate and the light source, and a heat spreader.

6 Claims, 8 Drawing Sheets

(56) References Cited

U.S. PATENT DOCUMENTS

| | | | |
|---|---|---|---|
| 2009/0097277 A1 | 4/2009 | Iwasaki | |
| 2011/0069510 A1 | 3/2011 | Yamashita et al. | |
| 2011/0128756 A1* | 6/2011 | Cho | G02B 6/0068 362/606 |
| 2012/0170311 A1* | 7/2012 | Huang | G02B 6/0088 362/611 |
| 2012/0236231 A1* | 9/2012 | Choi | G02B 6/009 349/65 |
| 2012/0320630 A1* | 12/2012 | Shimizu | G02B 6/0091 362/611 |
| 2014/0112018 A1* | 4/2014 | Su | G02B 6/0011 362/611 |

FOREIGN PATENT DOCUMENTS

| | | |
|---|---|---|
| JP | 2012-054108 A | 3/2012 |
| JP | 2012-186036 A | 9/2012 |
| JP | 2013-012445 A | 1/2013 |
| WO | WO2009122604 A1 | 10/2009 |

* cited by examiner

FIG. 8

LIGHT SOURCE DEVICE AND DISPLAY APPARATUS

This application is the national phase under 35 U.S.C. §371 of PCT International Application No. PCT/JP2013/067934 which has an International filing date of Jun. 28, 2013 and designated the United States of America.

TECHNICAL FIELD

The present invention relates to a light source device which includes a light guide plate for emitting light made incident on one side surface from one surface thereof, a light source disposed on the one side surface side of the light guide plate, and a housing body for housing the light guide plate and the light source, and a display apparatus including the light source device.

DESCRIPTION OF RELATED ART

In the case of a so-called edge light type light source device which irradiates a liquid crystal panel with light from a side surface side thereof, the liquid crystal panel includes, on a rear side thereof, a light guide plate which guides light from a light source to the liquid crystal panel.

However, recently, a size of the liquid crystal display apparatus is becoming larger, and thereby the size of the light guide plate included in the liquid crystal display apparatus has also been increased. In this way, due to the size of the light guide plate becoming larger, a thermal expansion amount of the light guide plate caused by heat generated during operating the liquid crystal display apparatus is also increased.

Therefore, in the edge light type liquid crystal display apparatus, it is necessary to sufficiently secure an interval between a side surface of the light guide plate, that is, a so-called incident surface and the light source.

However, when the interval between the light source and the incident surface is wide, an incident amount to the incident surface is decreased, and luminance may be deteriorated.

For the above-described problem, International Publication Pamphlet No. 2009/122604 discloses a planar light source device which is provided with a holding body for connecting a light guide plate and a light source unit while maintaining an interval therebetween, wherein the light source unit is configured so as to move in response to an expansion and contraction of the light guide body, such that the interval between the light source unit and the side surface of the light guide body with respect to the expansion and contraction of the light guide body is constantly maintained by the holding body.

SUMMARY

However, in such an above-described planar light source device of International Publication Pamphlet No. 2009/122604, the holding body for connecting the light guide body and the light source unit is separately provided, and thereby, a configuration of the planar light source device is complicated, and the number of components is increased, which causes an increase in manufacturing costs.

In consideration of the above-mentioned circumstances, it is an object of the present invention to provide a light source device which includes a light guide plate configured to emit light made incident on one side surface from one surface thereof, a light source disposed on the one side surface side of the light guide plate, and a housing body configured to house the light guide plate and the light source, wherein a heat transfer unit, which holds the light guide plate and the light source and transfers heat emitted from the light source to one surface of the housing body, is slidably formed on the one surface of the housing body, such that the light source which is held together with the light guide plate by the heat transfer unit also slides according to an expansion and contraction of the light guide plate, and thereby it is possible to constantly maintain an interval between the light source and the light guide plate when the light guide plate is thermally expanded by a simpler configuration without adding a separate component, while suppressing the manufacturing costs, and a display apparatus including the light source device.

The light source device according to the present invention is a light source device including a light guide plate configured to emit light made incident on one side surface from one surface thereof, a light source disposed on the one side surface side of the light guide plate, and a housing body configured to house the light guide plate and the light source, the light source device comprising: a heat transfer unit configured to hold the light guide plate and the light source and transfer heat emitted from the light source to one surface of the housing body, wherein the heat transfer unit has a plate part which is interposed between the other surface of the light guide plate and the one surface of the housing body, the heat transfer unit is configured to slide on the one surface of the housing body in a facing direction in which the one side surface of the light guide plate and the other side surface corresponding thereto face each other, and the heat transfer unit is configured to be prevented from being separated from the one surface of the housing body.

According to the present invention, since the light source is held together with the light guide plate by the heat transfer unit, for example, when the light guide plate is thermally extended, and contracted, the heat transfer unit slides on the one surface of the housing body in the direction in which the one side surface and the other side surface of the light guide plate face each other according to the expansion and contraction of the light guide plate, without being separated from the one surface of the housing body. Thereby, since the light source also moves, when the light guide plate is thermally expanded, the interval between the light source and the light guide plate is constantly maintained.

The light source device according to the present invention is a light source device including a light guide plate configured to emit light made incident on one side surface from one surface thereof, a light source disposed on the one side surface side of the light guide plate, and a housing body configured to house the light guide plate and the light source, the light source device comprising: a heat transfer unit configured to hold the light guide plate and the light source and transfer heat emitted from the light source to one surface of the housing body, wherein the heat transfer unit includes an engaging part configured to be engaged to the light guide plate, the light guide plate includes an engaged part to which the engaging part is engaged, and the heat transfer unit is configured so as to slide on the one surface of the housing body according to an expansion and contraction of the light guide plate.

According to the present invention, since the heat transfer unit and the light guide plate are engaged with each other by the engaging part of the heat transfer unit and the engaged part of the light guide plate, for example, when the light guide plate is thermally expanded, and contracted in the facing direction, the heat transfer unit slides according to the expansion and contraction of the light guide plate, and thereby, the light source also moves while the interval between the light source and the light guide plate is constantly maintained.

The light source device according to the present invention is a light source device, wherein the heat transfer unit includes a long hole formed in the plate part with the facing direction as a major axis direction, and an engaging pin which is inserted into the long hole of the plate part, and has one end which is fixed to the one surface of the housing body and the other end which is provided with a head portion having a larger diameter than a minor axis of the long hole.

According to the present invention, the heat transfer unit slides in the major axis direction of the long hole, that is, in the facing direction, while separating from the one surface of the housing body is prevented by the engaging pin.

The light source device according to the present invention is a light source device, wherein the heat transfer unit is adhered to the light guide plate by the plate part, and the heat transfer unit is configured so as to slide according to the expansion and contraction of the light guide plate in the facing direction.

According to the present invention, since the plate part of the heat transfer unit is adhered to the light guide plate, for example, when the light guide plate is thermally expanded, and contracted in the facing direction, the heat transfer unit slides according to the expansion and contraction of the light guide plate, and thereby, the light source also moves while the interval between the light source and the light guide plate is constantly maintained.

The light source device according to the present invention is a light source device, wherein the light source is further provided on the other side surface side of the light guide plate, and comprising: an abutting part configured to abut the one side surface or the other side surface of the light guide plate, and maintain an interval between the one side surface or the other side surface and the light source, and a spring configured to pull the plate part to a side opposite to a direction in which the light guide plate is extended.

According to the present invention, when the light guide plate is extended (thermally expanded) in the facing direction, the abutting part and the one side surface or the other side surface of the light guide plate abut each other, and in this state, the light guide plate is continuously expanded. In addition, when the light guide plate is contracted, with the abutting part and the one side surface or the other side surface of the light guide plate abutting each other, the plate part is pulled to the side opposite to the direction in which the light guide plate is extended by the spring. Accordingly, the light source also moves according to the expansion and contraction of the light guide plate while the interval between the same and the light guide plate is constantly maintained.

The light source device according to the present invention is a light source device, comprising: a substrate on which the light source is mounted on one surface thereof, wherein the substrate is provided with an abutting part which is formed on the one surface of the substrate to abut the one side surface or the other side surface of the light guide plate, and maintain an interval between the one side surface or the other side surface and the light source, the heat transfer unit includes a support plate which is extended at an edge of the plate part so that one surface thereof abuts the other surface of the substrate, and the one surface of the substrate faces the one side surface or the other side surface of the light guide plate, and the support plate includes a pressing spring which is disposed on the other surface side of the support plate to press the plate part to the side opposite to the direction in which the light guide plate is extended.

According to the present invention, the plate part is always pressed to the side opposite to the direction in which the light guide plate is extended by the spring. When the light guide plate is extended (thermally expanded) in the facing direction, the abutting part and the one side surface or the other side surface of the light guide plate abut each other, and in this state, the light guide plate is continuously expanded. In addition, when the light guide plate is contracted, with the abutting part and the one side surface or the other side surface of the light guide plate abutting each other, the plate part is pressed to the side opposite to the direction in which the light guide plate is extended by the spring. Accordingly, the light source also moves according to the expansion and contraction of the light guide plate while the interval between the same and the light guide plate is constantly maintained.

The display apparatus according to the present invention is a display apparatus comprising: the light source device defined above; and a display panel which is provided on the one surface side of the light guide plate of the light source device, and displays an image using light made incident thereon through the light guide plate.

According to the present invention, the light made incident on the light guide plate of the light source device is propagated in the light guide plate while being totally reflected, and the light is uniformly emitted from the one surface of the light guide plate, such that the image is displayed by the display panel using the light emitted from the light guide plate.

According to the present invention, since a conventional heat transfer unit is used, it is possible to constantly maintain the interval between the light source and the light guide plate when the light guide plate is thermally expanded by a simpler configuration without adding a separate component, while suppressing the manufacturing costs.

The above and further objects and features will move fully be apparent from the following detailed description with accompanying drawings.

DETAILED DESCRIPTION

Hereinafter, a case in which a light source device and a display apparatus according to embodiments of the present invention are applied to a so-called liquid crystal display apparatus including a liquid crystal display panel will be described in detail, by way of an example, with reference to the accompanying drawings. Hereinafter, for the convenience of explanation, a left-right and an up-down of the liquid crystal display apparatus are referred to as a lateral direction and a longitudinal direction, respectively.

Embodiment 1

Figure 1:
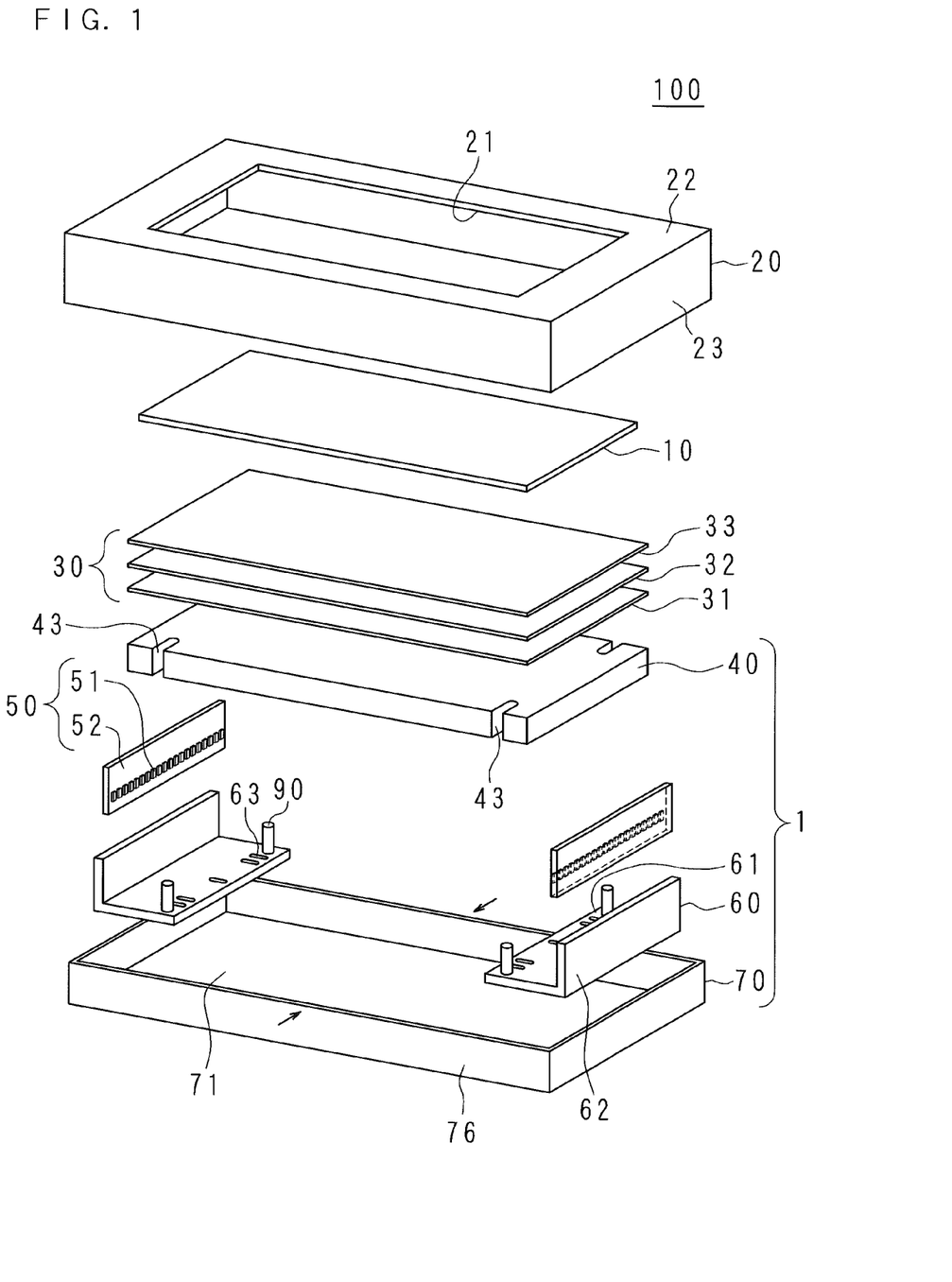
FIG. 1 is an exploded perspective view illustrating a configuration of main components of a liquid crystal display apparatus according to Embodiment 1 of the present invention.
Figure 2:
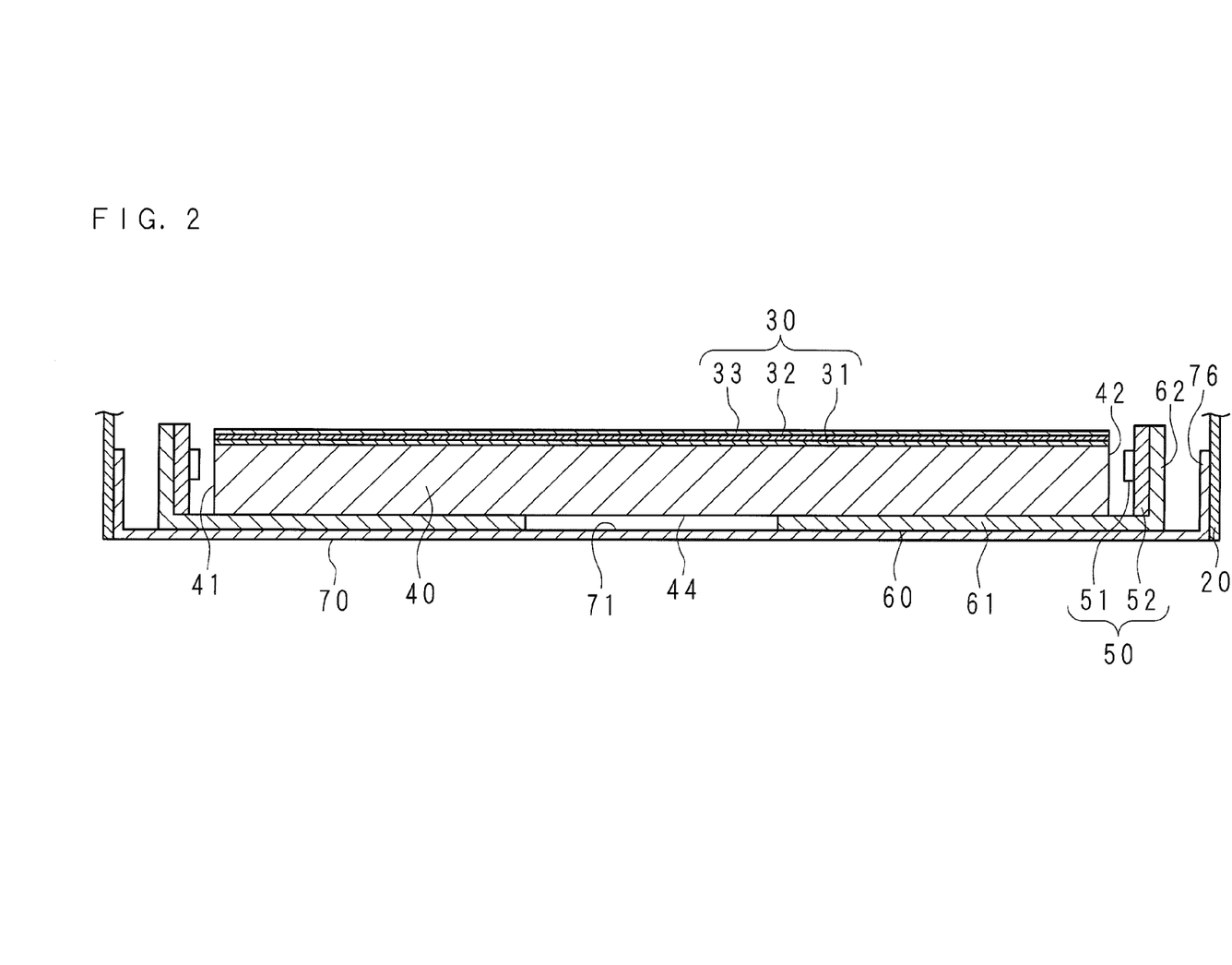
FIG. 2 is a transverse cross-sectional view illustrating the configuration of the main components of the liquid crystal display apparatus according to Embodiment 1 of the present invention while a part thereof is not illustrated.

FIG. 1 is an exploded perspective view illustrating a configuration of main components of a liquid crystal display apparatus according to Embodiment 1 of the present invention. A liquid crystal display apparatus 100 according to Embodiment 1 of the present invention is illustrated in FIG. 1. In addition, FIG. 2 is a transverse cross-sectional view illustrating the configuration of the main components of the liquid crystal display apparatus 100 according to Embodiment 1 of the present invention while a part thereof is not illustrated. The liquid crystal display apparatus 100 according to Embodiment 1 of the present invention is a so-called edge light type, and has a light source at both ends thereof in the lateral direction.

The liquid crystal display apparatus 100 includes a liquid crystal display panel 10, a front housing body 20, an optical sheet 30, and a light source device 1. In addition, the light source device 1 has a light guide plate 40, light source units 50, heat spreaders 60, and a rear housing body 70 (housing body).

The liquid crystal display apparatus 100 has a pair of light source units 50, as described above. The light source units 50 are disposed inside of a housing of the liquid crystal display apparatus 100 formed by the front housing body 20 and the rear housing body 70. One of the pair of light source units 50 is disposed on one end side of the liquid crystal display apparatus 100 in the lateral direction thereof, and the other one is disposed on the other end side in the lateral direction.

The light source units 50 include light sources 51 such as a plurality of LEDs having emission wavelengths of different spectrums from each other, and a light source mounting substrate 52 on which the light sources 51 are mounted on one surface thereof. The light sources 51 are arranged in a longitudinal direction on the both end sides of the liquid crystal display apparatus 100 in the lateral direction thereof, and include a plurality of LEDs. The light sources 51 are attached to the strip-shaped light source mounting substrates 52 and 52. The light source mounting substrates 52 and 52 are disposed to face each other on the both end sides of the liquid crystal display apparatus 100 in the lateral direction thereof, respectively.

That is, the light source mounting substrates 52 and 52 are disposed so that a thickness direction thereof runs along in the lateral direction, a long-side direction thereof runs along the longitudinal direction, and a short-side direction runs along a thickness direction of the liquid crystal display apparatus 100 (hereinafter, a front-back direction). The plurality of light sources 51, 51, . . . and 51 are linearly disposed in the long-side direction of the light source mounting substrate 52. The light source mounting substrate 52 is made of, for example, a metallic material such as aluminum, which has high thermal conductivity and heat dissipation, so as to efficiently transmit heat generated in the plurality of light sources 51, 51, . . . and 51 and radiate it to an outside.

In addition, the liquid crystal display apparatus 100 includes a pair of heat spreaders 60 and 60, which are respectively disposed in the vicinity of the light source units 50 and 50. The heat generated in the plurality of light sources 51, 51, . . . and 51 passes through the light source mounting substrate 52, and is diffused by the heat spreaders 60 and 60. The heat spreader 60 has a rectangular plate-shaped plate part 61 disposed along a surface orthogonal to the front-back direction, and a rectangular plate-shaped rising part 62 (support plate) which extends from an outer end portion of the plate part 61 in the front-back direction. The heat spreader 60 has an L shape as viewed in a lateral cross-section, as illustrated in FIG. 2. The plate part 61 is a rectangular shape with the longitudinal direction as a long-side direction, and the lateral direction as a short-side direction.

In more detail, the rising part 62 of the heat spreader 60 is disposed at the outside from the light source mounting substrate 52 in the lateral direction of the liquid crystal display apparatus 100. The inside of the rising part 62 contacts the other surface of the light source mounting substrate 52 through the surface. A heat transfer sheet may be disposed between the light source mounting substrate 52 and the rising part 62 for improving contact properties to reduce thermal resistance. In addition, the plate part 61 is configured so as to contact with a bottom surface 71 (one surface) of the rear housing body 70 through the surface. That is, the heat spreader 60 has a function as a heat transfer member, which contacts the rear housing body 70 to transfer the heat generated in the light source unit 50 to the rear housing body 70.

The plate part 61 has a plurality of long holes 63, 63, . . . and 63 formed therein by penetrating the plate part 61 in the thickness direction. As illustrated in FIG. 1, the long holes 63, 63, . . . and 63 are formed so that a major axis direction thereof extends in the lateral direction of the liquid crystal display apparatus 100. In other words, the major axis direction of the long holes 63, 63, . . . and 63 coincides with an expansion and contraction direction of the light guide plate 40, as described below. The long holes 63, 63, . . . and 63 are juxtaposed at an inner end portion of the plate part 61 in the long-side direction of the plate part 61.

The plate part 61 has engaging protrusions 90 (engaging parts) which protrude toward the light guide plate 40 side on one surface and at both end portions thereof in the long-side direction, so as to be engaged with notches 43 of the light guide plate 40 to be described below. The engaging protrusion 90 is formed in a column shape, and is inserted into the notch 43 of the light guide plate 40, such that the plate part 61 is engaged with the light guide plate 40. In addition, a diameter of the engaging protrusion 90 is the same as a dimension between the opposite inner surfaces of the notch 43. Thereby, the plate part 61 (heat spreader 60) may slide according to an expansion and contraction of the light guide plate 40 in the lateral direction of the liquid crystal display apparatus 100, while sliding of the plate part 61 is restricted by the light guide plate 40. Without limitation thereto, the diameter of the engaging protrusion 90 may be slightly smaller than the dimension between the opposite inner surfaces of the notch 43.

Meanwhile, the heat spreader 60 is made of, for example, a metal material such as aluminum, which has thermal conductivity equal to or higher than the light source mounting substrate 52.

The liquid crystal display apparatus 100 includes one rectangular plate-shaped light guide plate 40, which is provided with the long-side direction thereof as a lateral direction. The light guide plate 40 is made of a translucent material, and is made of, for example, a transparent resin material such as acryl. The light emitted from the LEDs of the light source 51 is made incident on side surfaces 41 and 42 at both end sides of the light guide plate 40. The side surfaces 41 and 42 of the light guide plate 40 play a role of a light incident surface which allows the light emitted from the plurality of light sources 51, 51, . . . and 51 to be made incident into the light guide plate 40, and the light made incident thereon is emitted from one surface of the light guide plate 40.

The notches 43 and 43 are formed at respective long-side edge portions of the light guide plate 40. The notches 43 and 43 are formed in a U shape, and as described above, the engaging protrusions 90 of the heat spreader 60 are inserted into the notches 43 and 43 to engage the heat spreader 60 and the light guide plate 40 with each other. That is, the notch 43 is an engaged part to be engaged with an engaging pin 63.

The light guide plate 40 has fine convexes and concaves (not illustrated) formed on the other surface 44 thereof. The light generated from the light source 51 is irregularly reflected by these fine convexes and concaves during propagating into the light guide plate 40. Thereby, the light made incident on the light guide plate 40 from the light source 51 is diffused, and the light is emitted from the whole of the one surface of the light guide plate 40. The one surface of the light guide plate 40 plays a role of a light emitting surface which emits the light from the light guide plate 40 to the outside. That is, the light guide plate 40 reflects the incident light which is made incident thereon from the side surfaces 41 and 42 to emit the light from the whole of the one surface. In other words, the light guide plate 40 plays a role of an optical element for converting the light emitted from the light source 51 in which the LEDs of a dot light source are linearly arranged into a planar light source.

The light guide plate 40 has a reflection plate (not illustrated) disposed on the other surface 44 side thereof. The reflection plate is disposed so as to face the other surface 44 of the light guide plate 40, and reflects a component proceeding to the other surface 44 of the scattering light propagating inside of the light guide plate 40 to lead it to one surface side of the light guide plate 40.

Meanwhile, the optical sheet 30 is disposed on the one surface side of the light guide plate 40. Specifically, the optical sheet 30 includes a diffusion sheet 31, a lens sheet 32, and a polarizing sheet 33. Optical properties of each of these sheets are optimally adjusted for the respective functions thereof.

The liquid crystal display panel 10 is disposed on a front side of the optical sheet 30. The liquid crystal display panel 10 is a rectangular plate shape, and disposed so as to cover the polarizing sheet of the optical sheet 30. A rear surface of the liquid crystal display panel 10 is irradiated with the light from the light guide plate 40 through the optical sheet 30, such that an image is displayed in a display region provided on a front surface of the front side. Therefore, a user may view this image through an opening part 21 of the front housing body 20 to be described below.

The front housing body 20 is disposed on the front surface side of the liquid crystal display panel 10. The front housing body 20 has a hollow rectangular front surface part 22 in which the opening part 21 is formed at a central portion thereof, and side surface parts 23 which extend from four side edge portions of the front surface part 22 in the front-back direction. The front surface part 22 of the front housing body 20 covers a peripheral region of the liquid crystal display panel 10, and the side surface parts 23 forms the side surfaces of the liquid crystal display apparatus 100 in the lateral direction.

The rear housing body 70 is a cylindrical shape having a bottom, and has the rectangular plate-shaped bottom surface 71, and side surface parts 76 which extend from peripheries of the bottom surface 71 in the front-back direction. Outer peripheral surfaces of the side surface parts 76 of the rear housing body 70 contact the inner peripheral surface of the side surface parts 23 of the front housing body 20 through the surface to be fixed to each other in this state. Thereby, the front housing body 20 and the rear housing body 70 form the housing of the liquid crystal display apparatus 100.

The light guide plate 40 has engaging parts (not illustrated) at side surfaces of the central portion in the long-side direction to be engaged with the side surface parts 76 (places illustrated by arrows in FIG. 1) of the rear housing body 70, and is positioned in the rear housing body 70 by appropriately engaging with the side surface parts 76.

Figure 3:
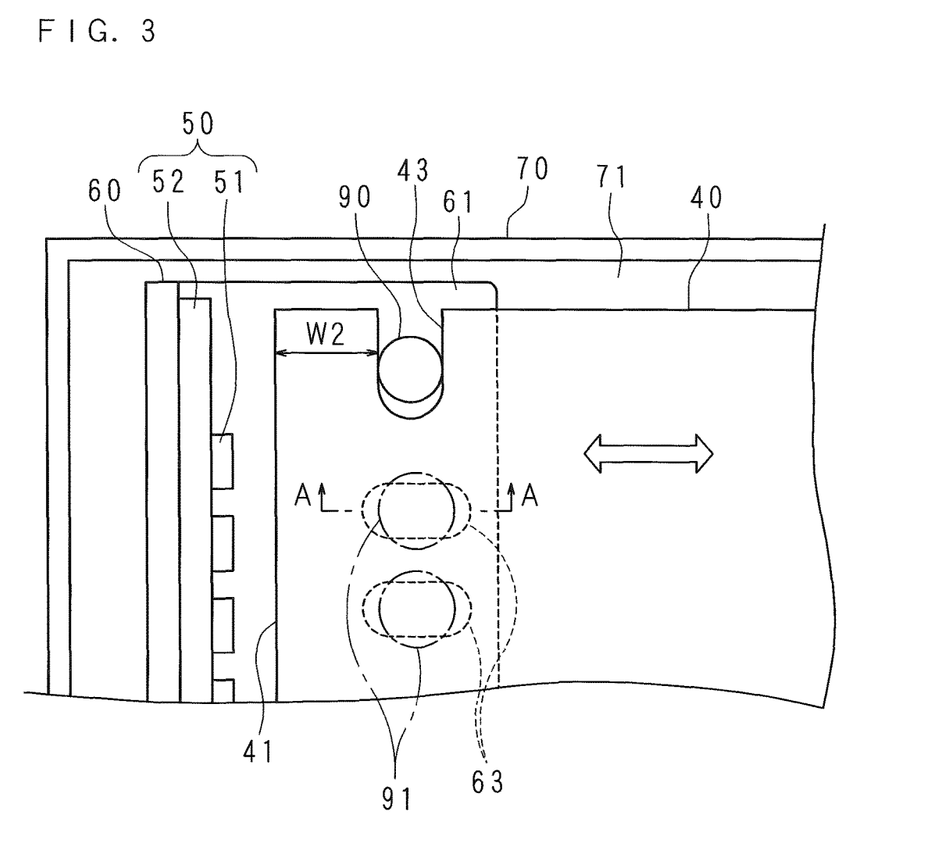
FIG. 3 is an explanatory view describing holding of a heat spreader in the liquid crystal display apparatus according to Embodiment 1 of the present invention.
Figure 4:
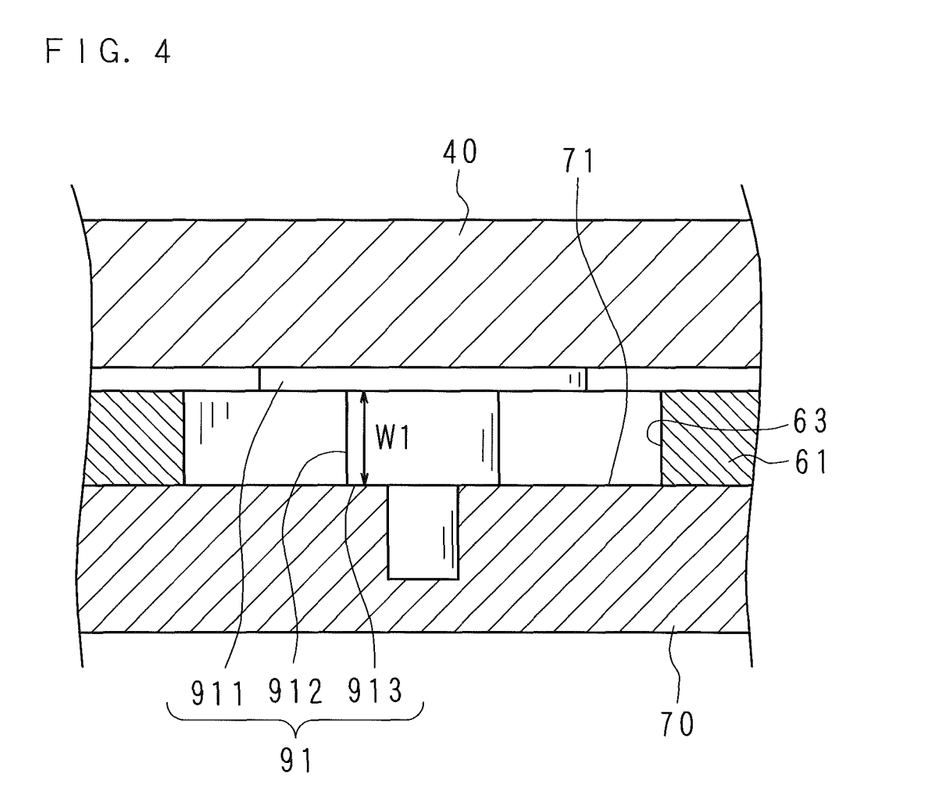
FIG. 4 is a partial cross-sectional view illustrating a cross-section taken on line A-A of FIG. 3.

The heat spreaders 60 and 60 are slidably held on the bottom surface 71 of the rear housing body 70. FIG. 3 is an explanatory view describing holding of the heat spreader 60 in the liquid crystal display apparatus 100 according to Embodiment 1 of the present invention, and FIG. 4 is a partial cross-sectional view illustrating a cross-section taken on line A-A of FIG. 3.

As illustrated in FIG. 3, the heat spreader 60 is provided so that the long-side direction of the plate part 61 is the longitudinal direction, and the one surface of the plate part 61 is provided so as to contact with the other surface 44 of the light guide plate 40 through the surface at an end portion of the light guide plate 40 in the long-side direction thereof. That is, the plate part 61 is interposed between the light guide plate 40 and the rear housing body 70 (bottom surface 71). Further, surface-contacting of the one surface of the plate part 61 with the other surface 44 of the light guide plate 40 at the end portion of the light guide plate 40 in the long-side direction thereof is not essential, and it may be provided to have a prescribed interval therebetween.

The heat spreader 60 (plate part 61) is slidably held on the bottom surface 71 by the engaging pin 91. The engaging pin 91 has a circular column-shaped body part 912 which penetrates each long hole 63 of the plate part 61, wherein one end of the body part 912 is fixed to the bottom surface 71 of the rear housing body 70, and the other end of the body part 912 is provided with a head portion 911 having a larger diameter than a minor axis of the long hole 63. Thereby, it is possible to prevent the plate part 61 (heat spreader 60) from being separated from the bottom surface 71, and allow the plate part 61 to slide in the major axis direction for only a distance of the major axis of the long hole 63.

In addition, the body part 912 of the engaging pin 91 is provided with a step portion 913, and a dimension W1 from the step portion 913 to the head portion 911 is equal to or slightly larger than a thickness of the plate part 61. Thereby, it is possible to restrict the body part 912 of the engaging pin 91 from being inserted into the bottom surface 71 deeper than the step portion 913, and prevent a pressing force more than necessary from being applied to the plate part 61, such that sliding of the plate portion 61 in the major axis direction of the plate part 61 may be ensured.

Further, as described above, the engaging protrusion 90 (engaging part) provided in the plate part 61 is inserted into the notch 43 (engaged part) of the light guide plate 40, and the plate part 61 is engaged with the light guide plate 40, such that sliding of the plate part 61 (heat spreader 60) in the lateral direction is restrained by the light guide plate 40.

Since the liquid crystal display apparatus 100 according to Embodiment 1 of the present invention has the above-described configuration, it is possible to solve the problems caused by varying an interval between the light source 51 and the incident surface (side surfaces 41 and 42) of the light guide plate 40 due to the thermal expansion of the light guide plate 40. Hereinafter, this will be described in detail using FIG. 3.

That is, in the liquid crystal display apparatus 100 according to Embodiment 1 of the present invention, as described above, since the central portion of the light guide plate 40 in the long-side direction thereof is engaged with the side surface parts 76 of the rear housing body 70, the light guide plate 40 may be extended or contracted from the central portion to the both end sides (a direction illustrated by an arrow in FIG. 3) in the long-side direction, or toward the central portion in the long-side direction.

For example, when the light guide plate 40 is thermally expanded, the light guide plate 40 may be extended in a direction in which the side surface 41 is approach the light source 51 (hereinafter, referred to as an extension direction). Meanwhile, the plate part 61 is engaged with the light guide plate 40 by the engaging protrusion 90 provided in the plate part 61 and the notch 43 of the light guide plate 40, such that, at this time, a force is applied to the heat spreader 60 in the extension direction. Further, the plate part 61 (heat spreader 60) is configured so as to slide in the major axis direction of the long hole 63, that is, in the extension direction, while separating from the bottom surface 71 is prevented by the engaging pin 91, such that the heat spreader 60 slides on the bottom surface 71 by the force applied thereto in the extension direction. Accordingly, when the light guide plate 40 is expanded due to heat, it is possible to maintain the interval between the light source 51 and the side surface 41 of the light guide plate 40, thus to solve the problems caused by varying the interval.

In addition, when the light guide plate 40 is contracted, similarly, the plate part 61 is engaged with the light guide plate 40, such that the heat spreader 60 may slide on the bottom surface 71 in the contraction direction according to the contraction of the light guide plate 40. Also in this case, it is possible to maintain the interval between the light source 51 and the side surface 41 of the light guide plate 40, thus to solve the problems caused by varying the interval.

Further, in the liquid crystal display apparatus 100 according to Embodiment 1 of the present invention, the notches 43 and 43 are provided in the vicinity of the side surfaces 41 and 42 of the light guide plate 40. A dimension W2 from the side surfaces 41 and 42 to the notches 43 of the light guide plate 40 is 20 mm, for example. In this way, the notches 43 and 43 are disposed on the side surfaces 41 and 42 side of the light guide plate 40 as much as possible, thereby it is possible to minimize a variation in the interval between the side surface 41 of the light guide plate 40 and the light source 51 due to the end portion relating to the dimension W2 in the light guide plate 40 being thermally expanded.

Embodiment 2

In the liquid crystal display apparatus 100 (light source device 1) according to Embodiment 1 of the present invention, the case in which the engaging protrusion 90 of the heat spreader 60 is inserted into the notches 43 and 43, and the heat spreader 60 and the light guide plate 40 are engaged with each other has been described, by way of example, but the present invention is not limited thereto.

Figure 5:
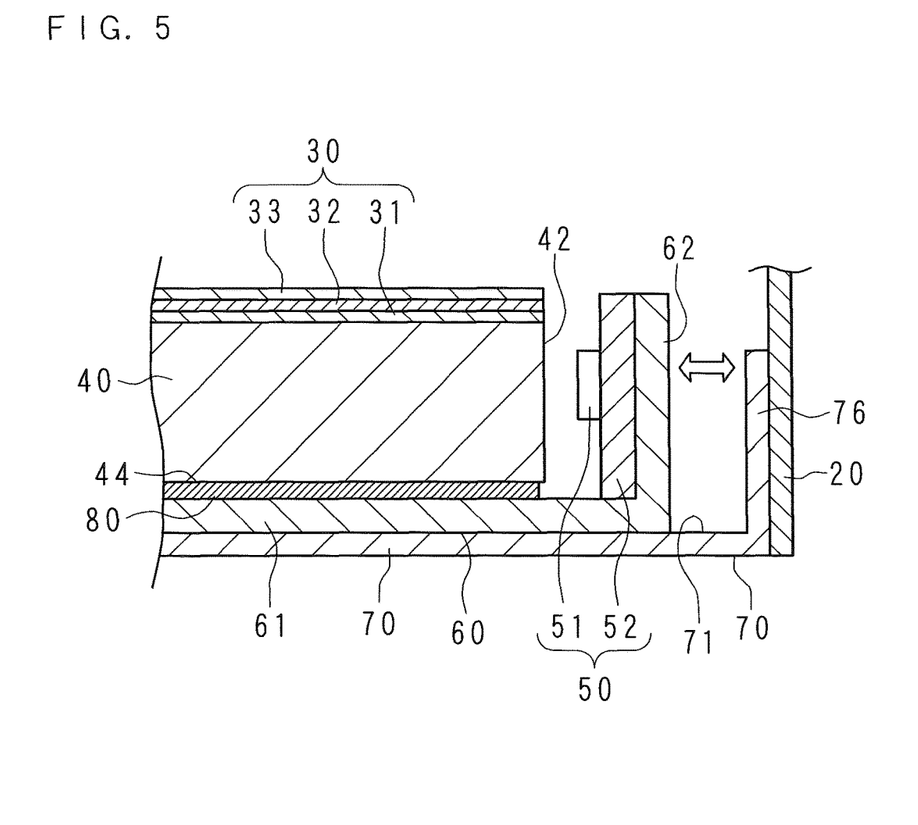
FIG. 5 is a partial cross-sectional view describing a relation between the heat spreader and a light guide plate in a liquid crystal display apparatus according to Embodiment 2 of the present invention.

FIG. 5 is a partial cross-sectional view describing a relation between the heat spreader 60 and the light guide plate 40 in a liquid crystal display apparatus 100 according to Embodiment 2 of the present invention.

In the liquid crystal display apparatus 100 according to Embodiment 2 of the present invention, a double-sided tape 80 is interposed between the light guide plate 40 and the plate part 61 of the heat spreader 60, and the plate part 61 is adhered to the light guide plate 40. That is, in Embodiment 2 of the present invention, the heat spreader 60 (plate part 61) is slidably held on the bottom surface 71 by the double-sided tape 80, and thereby, the plate part 61 (heat spreader 60) slides on the bottom surface 71 according to the expansion and contraction of the light guide plate 40.

In the liquid crystal display apparatus 100 according to Embodiment 2 of the present invention, the other configuration is the same as that of Embodiment 1, and therefore will not be described in detail.

Since the liquid crystal display apparatus 100 according to Embodiment 2 of the present invention has the configuration as described above, it is possible to solve the problems caused by varying the interval between the light source 51 and the incident surface (side surfaces 41 and 42) of the light guide plate 40, due to being thermally expanded the light guide plate 40 caused by heat generated during operating.

For example, when the light guide plate 40 is thermally expanded, the light guide plate 40 may be extended in a direction in which the side surface 42 approaches the light source 51 (hereinafter, referred to as an extension direction) (see FIG. 5). Meanwhile, the plate part 61 is adhered to the light guide plate 40 by the double-sided tape 80, such that, at this time, a force is applied to the heat spreader 60 in the extension direction. In addition, the plate part 61 (heat spreader 60) is configured so as to slide in the major axis direction of the long hole 63, that is, in the extension direction, while separating from the bottom surface 71 is prevented by the engaging pin 91, such that the heat spreader 60 slides on the bottom surface 71 by the force applied thereto in the extension direction. Accordingly, when the light guide plate 40 is expanded due to heat, it is possible to maintain the interval between the light source 51 and the side surfaces 41 and 42 of the light guide plate 40, thus to solve the problems caused by varying the interval. Further, these operation and effect are the same as the case of contracting the light guide plate 40, and therefore will not be described in detail.

The same parts as those in Embodiment 1 will be denoted by the same reference numerals, and will not be described.

Embodiment 3

A liquid crystal display apparatus 100 (light source device 1) according to Embodiment 3 has substantially the same configuration as Embodiments 1 and 2, and similar to Embodiments 1 and 2, is configured so that the heat spreader 60 slides according to the expansion and contraction of the light guide plate 40.

However, the liquid crystal display apparatus 100 according to Embodiment 3 is configured so that sliding of the heat spreader 60 according to the expansion and contraction of the light guide plate 40 is performed by a mechanism different from Embodiments 1 and 2, which will be described in detail below.

Figure 6:
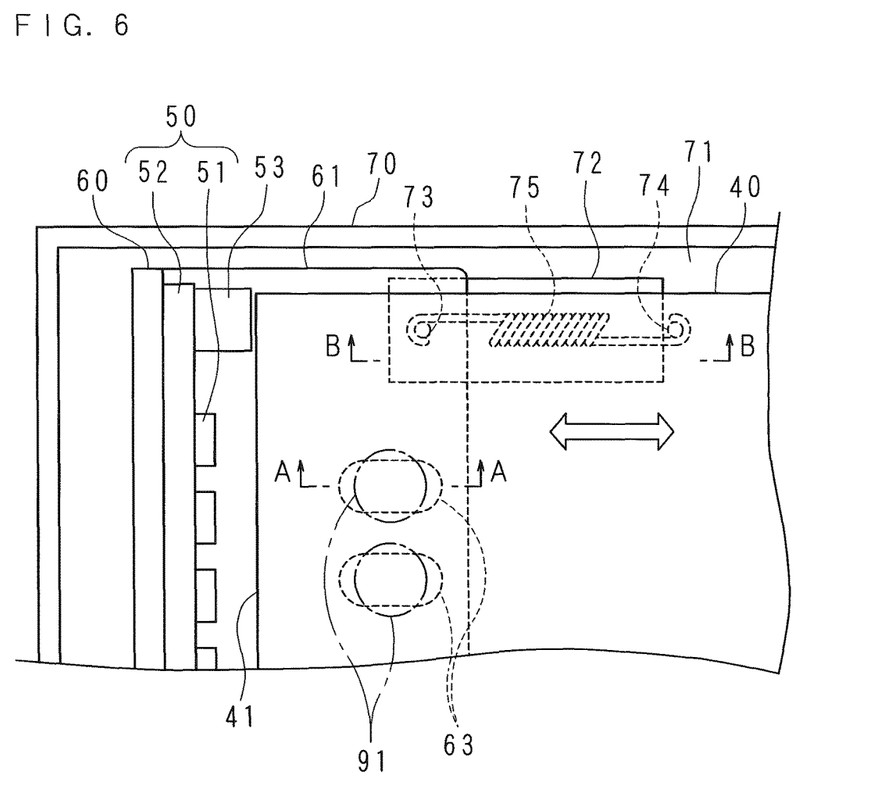
FIG. 6 is a partial cross-sectional view describing a relation between the heat spreader and the light guide plate in a liquid crystal display apparatus according to Embodiment 3 of the present invention.
Figure 7:
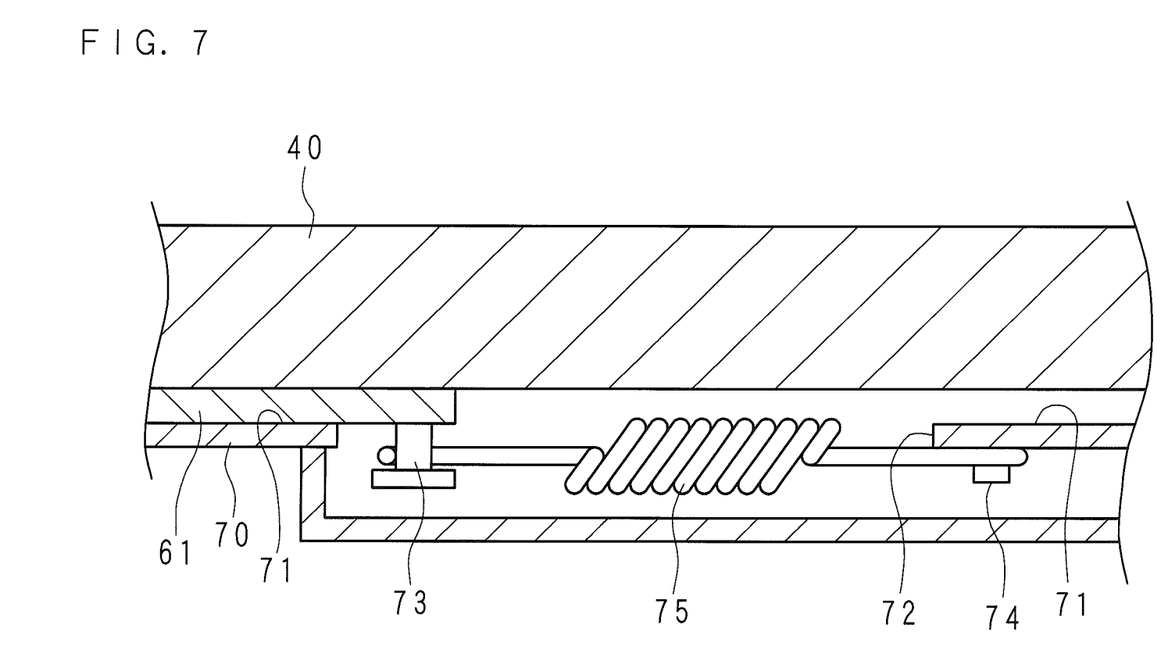
FIG. 7 is a partial cross-sectional view illustrating a cross-section taken on line B-B of FIG. 6.

FIG. 6 is a partial cross-sectional view describing a relation between the heat spreader 60 and the light guide plate 40 in a liquid crystal display apparatus 100 according to Embodiment 3 of the present invention, and FIG. 7 is a partial cross-sectional view illustrating a cross-section taken on line B-B of FIG. 6.

The liquid crystal display apparatus 100 according to Embodiment 3 of the present invention includes an abutting part 53 which is provided in the light source mounting substrate 52 to abut the light guide plate 40, and a pulling spring 75 for pulling the heat spreader 60 toward the center side of the light guide plate 40 in the long-side direction thereof.

The abutting part 53 is provided on at least one end portion of the light source mounting substrate 52 in the long-side direction thereof. In more detail, the abutting part 53 is provided at one end portion of the light source mounting substrate 52, and in the vicinity of the end portions of the side surfaces 41 and 42 of the light guide plate 40 in the long-side direction thereof. The abutting part 53 protrudes in a direction perpendicular to the surface of the light source mounting substrate 52, and has a larger dimension in this direction than the LED of the light source 51. Accordingly, when the light guide plate 40 is thermally expanded in the light source 51 side, the abutting part 53 abuts the side surfaces 41 and 42 of the light guide plate 40 abut in advance of the light source 51, such that further narrowing the interval between the side surfaces 41 and 42 and the light source 51 may be prevented, while the interval is maintained.

The spring 75 is a so-called coil spring, and includes hooks at both ends of a coil part, respectively. A rectangular cut-away part 72 in which the spring 75 is located is formed in the bottom surface 71 of the rear housing body 70 on the side surface part 76 side in the vicinity of the plate part 61. The cut-away part 72 is formed to a portion facing the inner end portion of the plate part 61 in the bottom surface 71, and a portion of the plate part 61 may be viewed through the cut-away part 72 of the bottom surface 71.

In this way, a surface (hereinafter, the other surface) of the plate part 61 viewed through the cut-away part 72 is provided with a locked protrusion 73 which protrudes toward the bottom surface 71 in the vicinity of the one short side of the cut-away part 72. In addition, the bottom surface 71 in the vicinity of the other short side of the cut-away part 72 is provided with a locked protrusion 74 which protrudes outward in the direction perpendicular to the bottom surface 71.

The spring 75 is placed within the cut-away part 72, and one hook thereof is hooked to the locked protrusion 73, and the other hook thereof is hooked to the locked protrusion 74. Accordingly, a tensile force of a prescribed magnitude is always applied to the plate part 61 by the spring 75 from the locked protrusion 73 to the locked protrusion 74 direction. In addition, such a mechanism including the spring 75 is provided at four corners of the rear housing body 70. Further, the present invention is not limited thereto. The mechanism including the spring 75 may be configured in such a manner that they are provided at a total of two places one by one at the center sides of the respective heat spreaders 60 (plate parts 61), and they are provided at a total of six places at the four corners of the rear housing body 70 and the center sides of the respective heat spreaders 60 (plate parts 61), without limitation in the place and the number thereof.

The liquid crystal display apparatus 100 according to Embodiment 3 of the present invention is not limited to the above-described configuration, and may be configured so as to use a leaf spring instead of the coil spring.

Since the liquid crystal display apparatus 100 according to Embodiment 3 of the present invention has the configuration as described above, it is possible to solve the problems caused by varying the interval between the light source 51 and the incident surface (side surfaces 41 and 42) of the light guide plate 40, due to being thermally expanded the light guide plate 40 caused by heat generated during operating.

In the liquid crystal display apparatus 100 according to Embodiment 3 of the present invention, as described above, the light guide plate 40 may be extended from the central portion to the both end sides in the long-side direction, and contracted toward the central portion.

For example, when the light guide plate 40 is thermally expanded, the light guide plate 40 may be extended in a direction in which the side surfaces 41 and 42 approach the light source 51 (hereinafter, referred to as an extension direction) (see FIG. 5). When the light guide plate 40 is extended at a prescribed distance, the side surfaces 41 and 42 of the light guide plate 40 abut the abutting part 53. Meanwhile, as described above, the tensile force is applied to the plate part 61 by the spring 75 in a direction opposite to the extension direction, but this tensile force is smaller than a force due to the extension of the light guide plate 40. Accordingly, the light guide plate 40 is continuously extended in the extension direction, with the side surfaces 41 and 42 abutting the abutting part 53, that is, while pressing the abutting part 53.

In addition, the plate part 61 (heat spreader 60) is configured so as to slide in the major axis direction of the long hole 63, while separating from the bottom surface 71 is prevented by the engaging pin 91, such that the heat spreader 60 slides on the bottom surface 71 by the force applied thereto in the extension direction, but also in this case, the interval between the side surfaces 41 and 42 of the light guide plate 40 and the light source 51 may be maintained by the abutting part 53.

On the other hand, when the operation of the liquid crystal display apparatus 100 is ended, and the light guide plate 40 is contracted, the force relating to the extension of the light guide plate 40 does not reach the heat spreader 60 (abutting part 53), and only the tensile force in the direction opposite to the extension direction is exclusively applied thereto by the spring 75.

Accordingly, when the light guide plate 40 is contracted, the heat spreader 60 (plate part 61) is pulled in the direction opposite to the extension direction by the spring 75. In this case, the light guide plate 40 is contracted in the direction opposite to the extension direction, with abutting the abutting part 53, such that the interval between the side surfaces 41 and 42 of the light guide plate 40 and the light source 51 is maintained by the abutting part 53.

From the above description, when the light guide plate 40 is extended or contracted, the interval between the light source 51 and the side surfaces 41 and 42 of the light guide plate 40 is maintained, thus solving the problems caused by varying the interval.

The same parts as those in Embodiment 1 will be denoted by the same reference numerals, and will not be described.

Embodiment 4

A liquid crystal display apparatus 100 (light source device 1) according to Embodiment 4 has substantially the same configuration as Embodiments 1 and 2, and similar to Embodiments 1 and 2, is configured so that the heat spreader 60 slides according to the expansion and contraction of the light guide plate 40.

However, the liquid crystal display apparatus 100 according to Embodiment 4 is configured so that sliding of the heat spreader 60 according to the expansion and contraction of the light guide plate 40 is performed by a mechanism different from Embodiments 1 and 2, which will be described in detail below.

Figure 8:
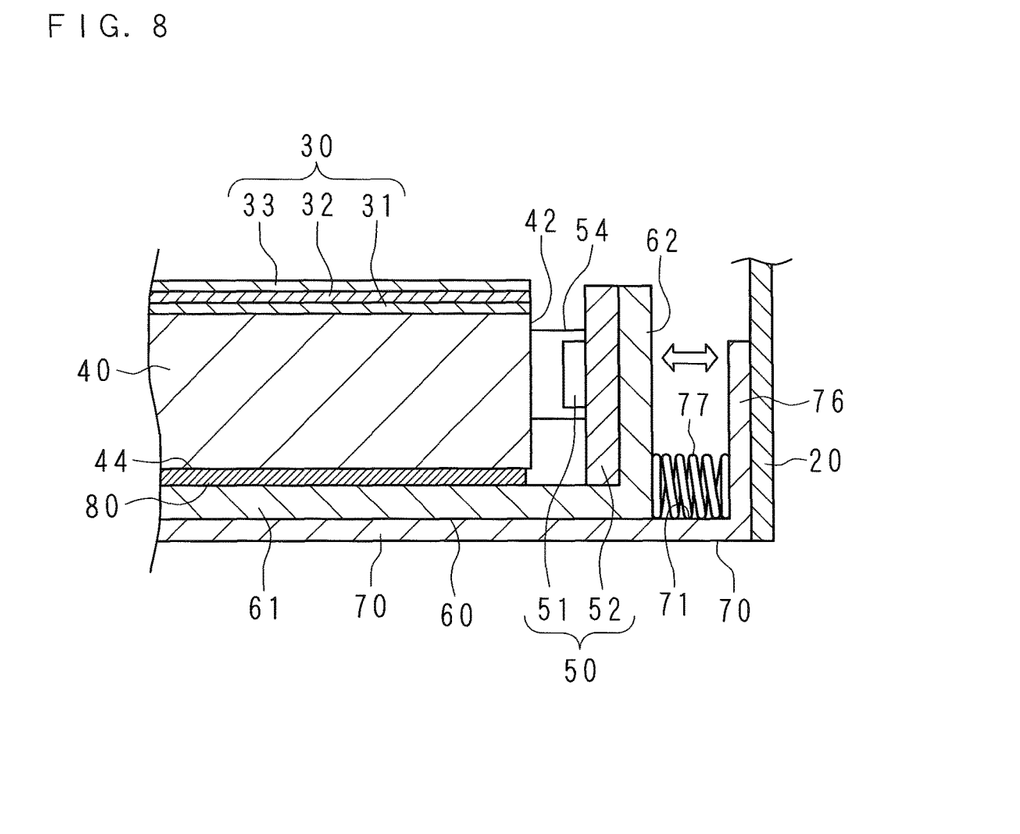
FIG. 8 is a partial cross-sectional view describing a relation between the heat spreader and the light guide plate in a liquid crystal display apparatus according to Embodiment 4 of the present invention.

FIG. 8 is a partial cross-sectional view describing a relation between the heat spreader 60 and the light guide plate 40 in a liquid crystal display apparatus 100 according to Embodiment 4 of the present invention.

The liquid crystal display apparatus 100 according to Embodiment 4 of the present invention includes an abutting part 54 which is provided in the light source mounting substrate 52 to abut the light guide plate 40, and a spring 77 for pressing the heat spreader 60 toward the center of the light guide plate 40 in the long-side direction thereof.

The abutting part 54 has, for example, a circular column-shape, and is provided at least one end portion of the light source mounting substrate 52 in the long-side direction thereof. In more detail, the abutting part 54 is provided at one end portion of the light source mounting substrate 52 and in the vicinity of the end portions of the side surfaces 41 and 42 of the light guide plate 40 in the long-side direction thereof. The abutting part 54 protrudes in a direction perpendicular to the surface of the light source mounting substrate 52, and has a larger dimension in this direction than the LED of the light source 51.

The spring 77 is provided at the outside of the rising part 62 of the heat spreader 60. In more detail, the spring 77 is interposed on the bottom surface 71 of the rear housing body 70 between the rising part 62 and the side surface part 76 of the rear housing body 70. In addition, the spring 77 is a so-called coil spring, and is disposed so that the expansion and contraction direction thereof is the same direction as the expansion and contraction direction of the light guide plate 40.

In addition, a pressing force of a prescribed magnitude is always applied to the plate part 61 by the spring 77 toward the center of the light guide plate 40 in the long-side direction thereof. Accordingly, the abutting part 54 always abuts the side surfaces 41 and 42 of the light guide plate 40. That is, when the light guide plate 40 is either thermally expanded in the light source 51 side, or contracted toward the center in the long-side direction thereof, the abutting part 54 abuts the side surfaces 41 and 42 of the light guide plate 40, such that further narrowing the interval between the side surfaces 41 and 42 and the light source 51 may be prevented, while the interval is maintained.

The spring 77 is provided at the outside of the rising part 62 of the respective heat spreader 60 on at least one place, but it is not limited thereto, and the spring 77 may be provided at two places or more. Further, the spring 77 is not limited to the coil spring, and may be configured so as to use a leaf spring instead of the coil spring.

Since the liquid crystal display apparatus 100 according to Embodiment 4 of the present invention has the configuration as described above, it is possible to solve the problems caused by varying the interval between the light source 51 and the incident surface (side surfaces 41 and 42) of the light guide plate 40, due to the thermal expansion of the light guide plate 40 caused by heat generated during operating.

In the liquid crystal display apparatus 100 according to Embodiment 4 of the present invention, as described above,
the light guide plate 40 may be extended from the central portion to the both end sides in the long-side direction, and contracted toward the central portion.

For example, when the light guide plate 40 is thermally expanded, the light guide plate 40 may be extended in a direction in which the side surface 41 and 42 of the light guide plate 40 approach the light source 51 (hereinafter, referred to as an extension direction) (see FIG. 5). Meanwhile, as described above, the pressing force is applied to the plate part 61 by the spring 77 to a side opposite to the extension direction of the light guide plate 40, and the abutting part 54 always abuts the side surfaces 41 and 42 of the light guide plate 40, but this pressing force is smaller than the force due to the extension of the light guide plate 40. Accordingly, the light guide plate 40 is continuously extended in the extension direction, with the side surfaces 41 and 42 abutting the abutting part 54.

In addition, the plate part 61 (heat spreader 60) is configured so as to slide in the major axis direction of the long hole 63, while separating from the bottom surface 71 is prevented by the engaging pin 91, such that the heat spreader 60 slides on the bottom surface 71 by the force applied thereto in the extension direction, but also in this case, the interval between the side surfaces 41 and 42 of the light guide plate 40 and the light source 51 may be maintained by the abutting part 54.

On the other hand, when the light guide plate 40 is contracted, the force due to the extension of the light guide plate 40 is not applied to the heat spreader 60, and only the pressing force in the direction opposite to the extension direction is exclusively applied to the heat spreader 60 by the spring 77. Accordingly, when the light guide plate 40 is contracted, the heat spreader 60 (plate part 61) is pressed in the direction opposite to the extension direction by the spring 77.

Thereby, the light guide plate 40 is contracted in the direction opposite to the extension direction, with abutting the abutting part 54, and the heat spreader 60 (plate part 61) also moves in this direction, such that the interval between the side surfaces 41 and 42 of the light guide plate 40 and the light source 51 is be maintained.

In the above description, the case in which the light source 51 is disposed on the both end sides of the liquid crystal display apparatus 100 in the lateral direction thereof has been described, by way of an example, but the present invention is not limited thereto. For example, the light source 51 may be configured to be disposed on the both end sides of the liquid crystal display apparatus 100 in the longitudinal direction thereof, and may be configured to be disposed at the respective both end sides of the liquid crystal display apparatus 100 in the longitudinal and lateral directions thereof.

The same parts as those in Embodiment 1 will be denoted by the same reference numerals, and will not be described.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light source device which includes a light guide plate configured to emit light entered through one side surface from a front surface thereof, a light source disposed opposing the one side surface of the light guide plate, and a housing body configured to house the light guide plate and the light source, the light source device comprising:

a heat transfer unit configured to hold the light guide plate and the light source and transfer heat generated by the light source to a bottom surface of the housing body, wherein the heat transfer unit has a plate part which is interposed between the rear surface of the light guide plate and the bottom surface of the housing body, the heat transfer unit is adhered to the light guide plate by the plate part by a double-sided tape interposed between the light guide plate and the plate part, the heat transfer unit is configured to slide on the bottom surface of the housing body in a facing direction in which the one side surface of the light guide plate and the light source face each other, the heat transfer unit is configured to be prevented from being separated from the bottom surface of the housing body and includes a long hole formed in the plate part with the facing direction as a major axis direction, and an engaging pin which is penetrated through the long hole of the plate part, and has one end which is fixed to the bottom surface of the housing body and the other end which is provided with a head portion having a larger diameter than a minor axis of the long hole.

2. The light source device according to claim 1, comprising:

an abutting part configured to abut the one side surface of the light guide plate, and maintain an interval between the one side surface and the light source, and a spring configured to pull the plate part in a direction opposite to a direction in which the light guide plate is extended.

3. The light source device according to claim 1, comprising:

a substrate on which the light source is mounted on one surface thereof, wherein the substrate is provided with an abutting part which is formed on the one surface of the substrate to abut the one side surface of the light guide plate, and maintain an interval between the one side surface and the light source, the heat transfer unit includes a support plate which is extended at an edge of the plate part so that one surface thereof abuts the other surface of the substrate, and the one surface of the substrate faces the one side surface of the light guide plate, and the support plate includes a pressing spring which is disposed on the other surface side of the support plate to press the plate part to the side opposite to the direction in which the light guide plate is extended.

4. A display apparatus comprising:

the light source device according to claim 1 and a display panel which is provided in front of the light guide plate of the light source device, and displays an image using light made incident thereon through the light guide plate.

5. The light source device according to claim 1, wherein a body part of the engaging pin is provided with a step portion, wherein the step portion divides the body part into a first part between the head portion and the step portion and a second part between the step portion and the one end, a diameter of the first part is larger than a diameter of the second part, a distance of the first part along the axial direction of the engaging pin is substantially equal to the thickness of the plate part, and the second part is fitted into a recess formed in the bottom surface of the housing body.

6. The light source device according to claim 1, wherein the heat transfer unit includes an engaging part configured to be engaged to the light guide plate, and the light guide plate includes an engaged part to which the engaging part is engaged.

* * * * *